CLOSE & SANFORD.
9506X
Making Extracts.
Patented Mar. 18, 1836.
NO PRINTED COPY OF SPECIFICATION IN OFFICE.
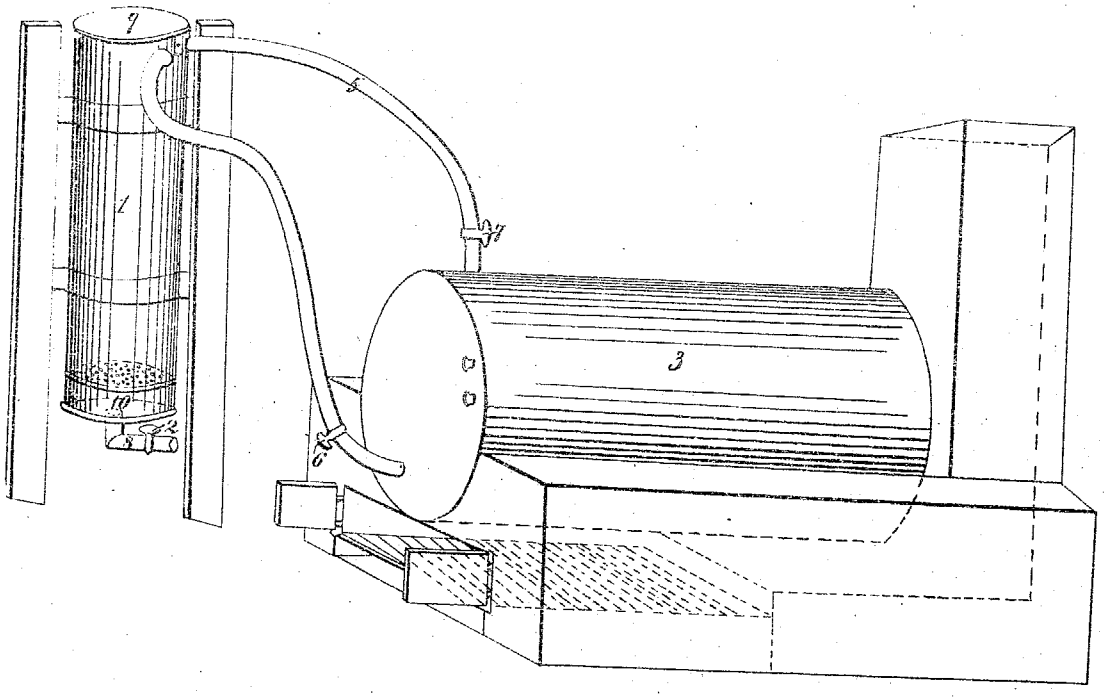

Thomas Close & John C. Sanford, of Rye. N.Y.
Letters Patent 9506X

The schedule referred to in these Letters Patent, and making part of the same, containing a description in the words of the said Thomas Close & John C. Sanford themselves, of their improvement in the art, mode and process of extracting the soluble matter and parts of vegetable substances and of separating the same from the wood and fibrous parts thereof.

To all to whom these presents shall come: Be it known that we Thomas Close and John C. Sanford, both of the Town of Rye, in the County of West Chester and State of New-York, have jointly invented a new and useful art, mode or process for extracting the soluble matter and parts of vegetable substances, and of separating the same from the wood and fibrous parts thereof; and that the following is a full and exact description thereof; the said art mode or process which we have invented, and for the invention of which we have prayed Letters Patent, in the foregoing petition, consists in the forcing through the cut, bruised or powdered particles of the vegetable substances, a volume of steam, water or other liquid, under and by a pressure varying in intensity according to the nature of the substance to be acted upon. The mode of applying the steam, fluid or menstruum, by which the said soluble matter is extracted may be as follows: a chamber of a cylindrical or other convenient form, steam tight and of such dimensions, as the object of the operator may require (our own now in use is an iron cylinder seven feet in length, and fourteen inches in diameter within) is placed in a suitable position (our own is placed perpendicularly) to receive the vegetable substance to be acted upon. The top or cap is fixed in common form by screws and flanges, and may be removed at pleasure, so as to put in the wood or other material. the bottom is open; but a basin of suitable depth (our own is three inches deep) covered with a plate perforated with small holes is fixed by screws and flanges in common form, steam tight to the bottom of the chamber. The edges of the perforated plate are let into a groove within the top of the basin, that it may lie smooth and level.
This plate is covered with flannel or other proper webbing to prevent
the passage of any thing but fluid from the chamber into the basin.
The bottom of the chamber may be tight, and holes perforated in it in
lieu of the plate attached to the basin - attached to this basin is a stop
cock by opening which the liquor or fluid is drawn off - a boiler of proper
dimensions (our own is horizontal eighteen feet long and two feet in diam-
-eter) is placed near this apparatus and connected with it by two pipes
or conduits passing from the boiler into the chamber at or near the
cap; one of which is to convey water and the other steam; the former
passes into the water in the boiler; each boiler has a stop cock.
After the material is placed in the chamber, ready for the operation
a sufficient quantity of hot water to saturate it, is forced from the boiler
into the chamber and operates upon the material under a strong pres-
-sure; (that of our apparatus is from one to two hundred pounds pressure
to the square inch) this is permitted to stand a short time, say ten
or twelve minutes, when the water is shut off by closing the stop cock;
the steam cock is then opened and an equally strong pressure of the
steam is exerted upon and through the material within the chamber,
for five or six minutes, which forces the water out through the substance
to be acted upon, carrying with it the matter extracted into the basin
which is drawn off from the basin, while the steam is operating: in
general two or three such operations will perfect the object -
By the pressure thus exerted upon and <u>through</u> the vegetable sub-
-stance will be immediately and perfectly extracted; and with the
use of a much less quantity of water and in much less time than
would be required by the ordinary processes of boiling, infusion,
steeping leaching &c. There are some substances to which it is not
proper to apply a hot fluid - In those, and if the operator pleases in
other cases, a hard pressure upon and through the vegetable sub-
-stance, by cold or warm water, or other liquids is adopted -
This may be effected by a forcing pump, or by a column of water or other
fluid operating on the hydrostatic principle - A column of water thirty feet in height in a tube will give a pressure of more than fourteen pounds to the square inch on every part of the material within the chamber: and the pressure, as is well known, may be increased at pleasure, by extending the height of the tube. This pump or tube may be applied to the chamber and basin, in lieu of the apparatus before described for the application of heated fluid.

The art mode or process for which letters patent are hereby claimed differs from any and every other mode of extracting the soluble matter or parts of vegetable substances heretofore used or known in this; that by this process the soluble matter is separated from the vegetable fibre by the force and pressure of steam, water or other liquids passing through the vegetable substance, thus exerting an equal or nearly equal pressure on every part of the material within the chamber, and not simply by external pressure on the material, nor by obtaining a solution without pressure. The substances to be acted upon by this process may be divided into four or more classes: First, any vegetable substance of which it is desired to make a medicinal extract or to use in the form of a syrup or concentrated infusion, as cicuta hyoscyamus, lettuce, senna, sarsaparilla peruvian bark &c. Second dyewoods of all kinds, as logwood, camwood, fustic &c. the infusions of which may afterwards be evaporated into hard extracts. Third, all the articles used in the preparation of simple or compound tinctures. Fourth, tanners bark, and all vegetables used for tanning leather, or for coloring, or for other purposes, and of which the soluble matter of whatever properties may be extracted and used in the arts or otherwise.

What we claim as our own invention and not previously known, in the several matters above specified, and for which we solicit Letters Patent is. First, that we are the original discoverers and inventors of the art of extracting the soluble parts of vegetable substances by means of the heavy pressure of steam, water or other fluids, exerted upon and through the materials, to be acted upon, however that pressure may be effected.
Secondly, we do not claim as our invention any part or parts of the machinery above mentioned separately taken; but we do claim as our invention, the combination of the said Chambers and perforated lid as above described; and also the combination of the boiler, water pipe and steam pipe, with said chamber and its said apparatus for the purposes aforesaid. In testimony whereof we have hereunto set our hands this twenty-ninth day of December, one thousand eight hundred and thirty-five.

Witnesses
Obadiah Eick
Geo. L. Close

Thomas Close
John C. Sanford

Filed